United States Patent [19]

Kong

[11] Patent Number: 4,603,191
[45] Date of Patent: Jul. 29, 1986

[54] PROCESS FOR PREPARING A UREA-FORMALDEHYDE RESIN HAVING A VERY LOW MOLE RATIO OF FORMALDEHYDE TO UREA

[75] Inventor: Ho C. Kong, Richmond, Calif.

[73] Assignee: Enigma N.V., Curacao, Netherlands Antilles

[21] Appl. No.: 675,195

[22] Filed: Nov. 27, 1984

[30] Foreign Application Priority Data

Dec. 9, 1983 [GB] United Kingdom ............... 8332962

[51] Int. Cl.$^4$ ............................................. C08G 12/12
[52] U.S. Cl. .................................................... 528/259
[58] Field of Search ........................................ 528/259

[56] References Cited

U.S. PATENT DOCUMENTS

| | | | |
|---|---|---|---|
| 2,810,710 | 10/1957 | Long | 528/259 |
| 3,183,200 | 5/1965 | Hewson | 528/259 |
| 4,021,413 | 5/1977 | Eisele et al. | 528/259 |
| 4,409,293 | 10/1983 | Williams | 528/259 |
| 4,410,685 | 10/1983 | Williams | 528/259 |
| 4,478,966 | 10/1984 | Helgesson et al. | 524/62 |
| 4,501,851 | 2/1985 | Williams | 528/259 |

Primary Examiner—Joseph L. Schofer
Assistant Examiner—N. Sarofim
Attorney, Agent, or Firm—Ladas & Parry

[57] ABSTRACT

Urea and formaldehyde are mixed in a mole ratio of about 1:2. The mixture is condensed for 30 minutes at a pH of 7.0 to 7.4 and a temperature between 80° and 85° C. The condensation is continued at a pH of 4.8 to 5.8 at the same temperature until the viscosity reaches values between 15 and 50 mPa.s. The mole ratio of urea to formaldehyde is adjusted to a value of 1:1.80 to 1:1.90 by adding urea. The condensation is continued under acidic conditions at the same temperature, until the viscosity reaches values of 35 to 80 mPa.s. At a pH of 5.8 to 6.5, the mole ratio of urea to formaldehyde is adjusted to a value between 1.0:1.0 and 1.0:1.30 by adding urea. The temperature is allowed to drop freely. When the temperature has dropped to below 50° C., the pH is adjusted to a value of 7.0 to 8.0.

4 Claims, No Drawings

PROCESS FOR PREPARING A UREA-FORMALDEHYDE RESIN HAVING A VERY LOW MOLE RATIO OF FORMALDEHYDE TO UREA

Convention urea-formaldehyde resins are normally manufactured in two stages. Urea and formaldehyde are mixed under neutral or slightly alkaline conditions at a mole ratio of formaldehyde to urea of 2:1 or more. The mixture is heated to almost reflux temperature to ensure that methylol ureas are formed. The solution thus obtained is then adjusted to a pH in the range of 6.5 to 5.0 and heated to reflux temperature (90° to 95° C.). The condensation is continued until the desired degree of condensation is achieved. The course of the polymerization can be watched by means of the following phenomena:

(a) Initially, a white solid precipitate forms in the solution upon cooling.

(b) As the polymerization proceeds, the temperature at which a precipitate separates falls, until a point is eventually reached at which the condensation products do no longer precipitate at room temperature. The reaction product is completely soluble in cold water.

(c) Upon further polymerization, the viscosity of the solution increases, the water tolerance diminishes, and the syrup sets to form an insoluble and irreversible gel.

Before the point of gelation, i.e. the desired degree of polymerization, which differs from manufacturer to manufacturer, is reached, the reaction is arrested by the addition of alkali until the sirup is slightly alkaline. Sufficient urea to give a final mole ratio of formaldehyde to urea of 1.5:1 or more is mixed into the syrup, either just before or after vacuum evaporation to remove water, or a part of the urea is added before and the remainder after vacuum evaporation to remove water. The product is then cooled to about 20° C. and is ready for use next day.

It is an object of the invention to provide a urea-formaldehyde resin having a very low content of free formaldehyde in order to eliminate potential health hazards to those handling the resin, especially during the production of plywood and particle board.

It is another object of the invention to provide a urea-formaldehyde resin suitable for use as a binder in the manufacture of particle board and plywood type panels, which panels have a very low formaldehyde emission and, therefore, do not pose problems as a source of health hazard to the end users, and yet satisfy the overall requirements with respect to the properties of the panel produced.

It is a further object of the invention to provide a urea-formaldehyde resin which, in addition to the properties mentioned above, has a storage stability of 4 weeks at 20° C. and a short hardening time (which means that it is reactive) and which can be used in the usual amounts in the production of particle board and plywood type panels.

The prior art resins which are normally manufactured in two stages have a rather high mole ratio of formaldehyde to urea (1.25 or more) and a rather high concentration of free formaldehyde. The process of the invention, in which the urea is added in three or more portions in one continuous operation, yields urea-formaldehyde resins having a very low mole ratio of formaldehyde to urea (1.0:1.0 to 1.15:1.0) and an extremely low concentration of free formaldehyde. Such resins are suitable for use as binders in the manufacture of particle board and plywood type panels, which panels have a very low formaldehyde emission.

The process of the invention eliminates the potential health hazard that is due to the use of conventional urea-formaldehyde resins, which use results in constant exposure of the workers to a high emission of free formaldehyde from the resin during the production of plywood and particle board in the factories, and in constant exposure of the end users to a high emission of free formaldehyde from the panels produced with the resins in homes, offices etc.

The specific reaction conditions affect the structural character of the resin produced in terms of methylol groups, methylene linkages, methylene-ether linkages and molecular weight as well as molecular weight distribution.

It is known that monomethylolurea and dimethylolurea are preferentially formed under neutral or mildly alkaline conditions at a mole ratio of formaldehyde to urea of 1.0:1.0 or 2:1, respectively. In dilute acid solution, the methylol and amide groups of methylolureas will undergo condensation reactions forming methylene linkages. In weakly acidic medium (pH=4 to 7), the methylol groups can also react with each other forming methylene-ether linkages.

The general structure of urea formaldehyde resins prior to cross-linking can be illustrated by the following formula:

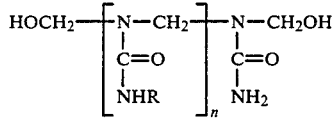

wherein R is hydrogen or a methylol group and n is the degree of polymerization. If R is hydrogen, an increase of the degree of polymerization will reduce the water miscibility of the resin and will prolong the hardening time of the resin. On the other hand, when R is a methylol group (—CH$_2$OH), the colloidal stability and water miscibility of the resin will be improved markedly when the degree of polymerization is increased, and such resin will have a relatively short hardening time. A high degree of polymerization is required for good physical properties, such as strength, tackiness and adhesion.

Various methods have been proposed for preparing urea-formaldehyde resins having good stability, dispersibility and adhesive properties together with a low content of free formaldehyde. However, an optimum balance of the desired properties is usually difficult to achieve. For example, the use of low mole ratios of formaldehyde to urea has produced resins with a low formaldehyde content, but having a poor stability and a long setting time.

The present invention overcomes the drawbacks of the prior art. The process of the present invention produces urea-formaldehyde resins which have a low mole ratio of formaldehyde to urea and low concentrations of free formaldehyde together with good colloidal stability and relatively high rates of setting. In addition, the resins produced according to the invention have good adhesive properties for manufacturing particle board and plywood type panels.

The process of the invention is characterized in that (a) urea and formaldehyde are mixed in a mole ratio of urea to formaldehyde of about 1.0:2.0, and the mixture is heated to a temperature between 80° and 85° C. under alkaline conditions, (b) the pH is then adjusted to a value in the range of 7.0 to 7.4, and the mixture is condensed for 30 minutes at the same temperature, (c) the pH is then adjusted to a value in the range of 4.8 to 5.8, and the condensation is continued under acidic conditions at the same temperature, until the viscosity reaches values between 15 and 50 mPa.s, (d) the mole ratio of urea to formaldehyde is adjusted to a value in the range of 1.0:1.70 to 1.0:1.9 by adding urea, and the condensation is continued under acidic conditions at the same temperature, until a viscosity in the range of 35 to 80 mPa.s is reached, (e) the pH is then adjusted to a value in the range of 5.8 to 6.5, and the final mole ratio of urea to formaldehyde is adjusted to a value between 1.0:1.0 and 1.0:1.30, preferably in the range of 1:1.105 to 1:1.12, by adding urea, whereafter the condensate is cooled, and (f) when the temperature has dropped to below 50° C., the final pH is adjusted to a value in the range of 7.0 to 8.0.

The process of the invention can be carried out as follows:

In the first stage, a known quantity of formalin is adjusted to a pH of 7.2 to 7.6 with a dilute sodium hydroxide solution, and mixed with urea in a mole ratio of formaldehyde to urea of 2.0:1.0. The solution thus obtained is heated to a temperature of 80° to 85° C. As soon as this temperature range is reached, the pH of the reaction mixture is adjusted to a value in the range of 7.0 to 7.4, and the reaction is carried out for 20 to 40 minutes at the same temperature. The reaction mixture is then acidified to a pH of 4.8 to 5.8 with formic acid solution, while the temperature is still maintained at 80° to 85° C. The condensation reaction is continued at this temperature until the reaction mixture has a viscosity of 15 to 35 mPa.s as measured with a Brookfield Viscometer (spindle No. 1) at 65° C.

In the second stage of the process, additional urea is introduced so that the overall mole ratio of formaldehyde to urea is 1.70:1.0 to 1.90:1.0. The condensation is continued under the same conditions, until the reaction mixture has a Brookfield viscosity in the range of 35 to 80 mPa.s as measured at 65° C. Once the desired viscosity is obtained, the pH of the reaction mixture is adjusted to a value in the range of 5.8 to 6.5 with a dilute sodium hydroxide solution.

In the third stage, the final mole ratio of total formaldehyde to total urea is adjusted to a value of 1.0:1.0 to 1.30:1.0 by the addition of urea. Heat is cut off, and the mixture is agitated for a further 20 to 30 minutes. The reaction mixture is cooled to around 60° C.

The resin is evaporated in vacuo at 54° to 57° C. to about 66% solids and then cooled to below 40° C. At this temperature, the pH of the resin is finally adjusted to about 7.4. The product is best stored at a temperature around 20° C. It is ready for use the next day.

The reactor used is fitted with an agitator. The reaction mixture is continuously agitated during the condensation.

The resins produced by the process of the present invention are characterized by their very low mole ratio of formaldehyde to urea, which is lower than that of any of the stable resins known in the prior art. Resins with a mole ratio of formaldehyde to urea as low as 1.0:1.0 can be prepared. In spite of this extremely low mole ratio, the resins are still stable over a sufficient period of time, and their setting time is relatively short. The most important feature is that the resins produced by the process of the invention have free formaldehyde contents equal to or lower than 0.15%, which could not be attained in the prior art.

The process of the invention is a major break through in the art of urea-formaldehyde resins, because the prior art resins with low mole ratios of formaldehyde to urea suffer from poor stability and poor reactivity.

The chipboard and plywood panels produced by using the resins prepared by the process of the invention have good mechanical properties and water resistance. In addition, the free formaldehyde contents of these panels are lower than the DIN standard E1=10 mg per 100 g board. The following Examples illustrate the present invention.

EXAMPLE 1

A reactor fitted with an agitator is used. The reaction mixture is agitated throughout the condensation. 2500 kg of 40% formalin are added to the reactor and neutralized with 40% sodium hydroxide solution to a pH of 7.4 under constant agitation. 1000 kg of urea are added, and the mixture is then heated to a temperature of 82° to 83° C. At this temperature, the pH is adjusted to 7.2. The condensation is carried out under these conditions for 30 minutes. Thereafter, the pH is adjusted to 5.4 with formic acid solution. The condensation is continued at the same temperature until the reaction mixture has a viscosity of 28 mPa.s as measured with a Brookfield Viscometer (spindle No. 1) at 65° C.

A second quantity of 100 kg of urea is immediately added. The condensation is continued at the same temperature until the reaction mixture has a Brookfield viscosity (spindle No. 1) of about 68 mPa.s as measured at 65° C. The pH of the reaction mixture is then adjusted to 6.1 by the addition of 40% sodium hydroxide solution.

A third quantity of 640 kg of urea is added, so that the final mole ratio of total formaldehyde to total urea is 1.15:1. Heat is cut off, and the final stage of the condensation is carried out for 25 minutes with agitation only. At the end of this time, the temperature of the reaction mixture has dropped to about 60° C.

The reaction mixture is evaporated under partial vacuum at 54° to 57° C. to 65.8% solids. It is then cooled to about 38° C., and the final pH is adjusted to 7.1 with 40% sodium hydroxide solution. The product is stored at about 20° C.

EXAMPLE 2

In a reactor which is fitted with an agitator, 2500 kg of 40% formalin are first neutralized with 40% sodium hydroxide solution to a pH of 7.4 under constant agitation. 1000 kg of urea are then added, and the mixture is heated to 85° C. At this temperature, the pH is adjusted to 7.1, and the reaction mixture is then condensed for 30 minutes. Thereafter, the pH is adjusted to 4.8 with formic acid solution. The condensation is continued until the reaction mixture has a Brookfield viscosity (spindle No. 1) of 24 mPa.s as measured at 65° C.

Thereafter, a second quantity of 110 kg of urea is added. The condensation is continued until the reaction mixture has a Brookfield viscosity (spindle No. 1) of about 40 mPa.s as measured at 65° C. At this stage, the pH is adjusted to 5.8 with 40% sodium hydroxide solution.

A third quantity of 223 kg urea is added, while the reaction temperature of 85° C. is maintained. The condensation is continued until the reaction mixture has a Brookfield viscosity (spindle No. 1) of about 50 mPa.s as measured at 65° C. The pH is adjusted to 6.2 with 40% sodium hydroxide solution. The heat is then cut off.

A fourth quantity of 467 kg of urea is added so that the final mole ratio of total formaldehyde to total urea is 1.10:1. The temperature is allowed to drop freely for 20 minutes. The reaction mixture is cooled to about 35° C., then the pH is adjusted to 7.2 with 40% sodium hydroxide solution. The final resin so obtained is cooled to 20° C. and stored at that temperature. The resin is suitable for plywood production as no dehydration has taken place.

Throughout the above condensation process, the reaction mixture is agitated.

The properties of the urea-formaldehyde resins obtained in Examples 1 and 2 are shown in Table I. The free formaldehyde content was determined by the sulfite method. It is lower than 0.15% in both resins.

TABLE I

| Properties | Example 1 | Example 2 |
| --- | --- | --- |
| Mole ratio of formaldehyde to urea | 1.15:1 | 1.10:1 |
| Solids content (%) | 65.8 | 50.2 |
| Specific gravity at 20° C. | 1.31 | 1.21 |
| Brookfield Viscosity (spindle No. 1) at 20° C. (mPa · s) | 750 | 182 |
| pH | 7.1 | 7.2 |
| Free formaldehyde (% by weight) | 0.13 | 0.11 |
| Stability at 20° C. (weeks) | 4 | 4 |

The properties of chipboard panels produced by using the urea-formaldehyde resins of Examples 1 and 2 are shown in Table II.

TABLE II

| Properties | Example 1 | Example 2 |
| --- | --- | --- |
| Urea formaldehyde resin (%) | 100 | 100 |
| Hardener (NH$_4$Cl) | 1 | 1 |
| Core Gel time at 100° C. (sec) | 87 | 86 |
| Surface Gel-time at 100° C. (sec) | 455 | 250 |
| Bending strength (N/mm$^2$) | 18.6 | 19.7 |
| Internal Bond (N/mm$^2$) | 0.55 | 0.51 |
| Free formaldehyde (mg HCHO/100 g board) | 9.2 | 8.7 |

Several tests were carried out wherein veneers of tropical hardwood species were bonded to form 3-ply plywoods by using resins produced by the process of the invention. Table III shows the results obtained with several typical glue mixtures using said resins.

TABLE III

| | | | | | | |
| --- | --- | --- | --- | --- | --- | --- |
| Mole ratio of formaldehyde to urea | 1.105 | 1.105 | 1.111 | 1.111 | 1.12 | 1.12 |
| Resin 50% solids | 100 | 100 | 100 | 100 | 100 | 100 |
| NH$_4$Cl 25% | 1.5 | 1.5 | 1.5 | 1.5 | 1.5 | 1.5 |
| Wheat Flour | 22.5 | 22.5 | 22.5 | 22.5 | 22.5 | 22.5 |
| Water | 7.5 | 7.5 | 7.5 | 7.5 | 7.5 | 7.5 |
| Glue spread in g/m$^2$ double glue lines | 344 | 344 | 344 | 344 | 344 | 344 |
| Gel-time at 100° C. (mins. + secs.) | 1 + 37 | 1 + 42 | 1 + 31 | 1 + 30 | 1 + 26 | 1 + 31 |
| Initial viscosity in mPa · s | 1625 | 1750 | 1810 | 2625 | 2000 | 2300 |
| Pot life measured up to 6000 mPa · s (hrs) | 7 | 4½ | 7 | 6 | 8 | 9 |
| Cold press time (mins.) | 20 | 20 | 20 | 20 | 20 | 20 |
| Hot press temp. (°C.) | 105 | 105 | 105 | 105 | 105 | 105 |
| Hot press time (mins) | 2 | 2 | 2 | 2 | 2 | 2 |
| Press pressure (kg/cm$^2$) | 10 | 10 | 10 | 10 | 10 | 10 |
| Average wet shearing strength (kg/cm$^2$) | 12.91 | 12.44 | 11.84 | 13.74 | 12.14 | 12.97 |
| Formaldehyde emission 2 hrs. desiccator test method (μg/ml) | 0.23 | 0.16 | 0.28 | 0.31 | 0.46 | 0.69 |

EXAMPLE 3

This Example compares the use of a low free formaldehyde resin prepared by the process of the invention in the production of particleboard with the use of a prior art urea-formaldehyde resin.

The glue formulations used are as follows:

| | 1 | 2 |
| --- | --- | --- |
| Urea-formaldehyde resin 65% of prior art having mole ratio F:U 1.27:1 (g) | 3077 | — |
| Urea-formaldehyde resin 65% prepared as in example 1 having mole ratio F:U 1.15:1 (g) | — | 3077 |
| Ammonia 25° Baume (g) | 10 | — |
| Hardener (15% ammonium chloride solution) (g) | 400 | 400 |
| Paraffin emulsion 50% (g) | 250 | 250 |
| Water (g) | 263 | 273 |
| Total (g) | 4000 | 4000 |
| Gel time (seconds) | 80 | 76 |

Single layer boards were pressed in the laboratory by spraying each of these formulations onto 25 kg of wood chips. Boards were pressed at 10, 9 and 8 sec/mm. The thickness of the boards was 17.3 mm. The temperature of the press was 200° C. and the pressure was 35 kg/cm$^2$. The dimensions of the boards produced were 40×56 cm.

The results obtained are reported in the following table and are average values.

| | 1 | 2 |
| --- | --- | --- |
| Density (kg/m$^3$) | 691 | 681 |
| Bending strength (N/mm$^2$) | 19.6 | 18.9 |
| Tensile strength (N/mm$^2$) | 0.56 | 0.55 |
| 2 hr. thickness swelling (%) | 9.8 | 10.5 |
| 24 hr. thickness swelling (%) | 25.5 | 26.0 |
| free formaldehyde (mg/100 g dry board) | 18.5 | 8.1 |

The above-mentioned results prove that the boards produced with the resin prepared by the process of the invention have a very low free formaldehyde content and that they actually yield boards having free formaldehyde contents below 10 mg/100 g dry board (and, therefore, belonging to DIN standard E1). The mechanical properties of these boards are not at all impaired as compared with those of the boards produced with the prior art resin.

I claim

1. A process for preparing a urea-formaldehyde resin having a very low mole ratio of formaldehyde to urea, characterized in that
    (a) urea and formaldehyde are mixed in a mole ratio of urea to formaldehyde of about 1.0:2.0, and the mixture is heated to a temperature between 80° and 85° C. under alkaline conditions, (b) the pH is then adjusted to a value in the range of 7.0 to 7.4, and the mixture is condensed for 30 minutes at the same temperature, (c) the pH is then adjusted to a value in the range of 4.8 to 5.8, and the condensation is continued under acidic conditions at the same temperature, until the viscosity reaches values between 15 and 50 mPa.s, (d) the mole ratio of urea to formaldehyde is adjusted to a value in the range of 1:1.80 to 1:1.90 by adding urea, and the condensation is continued under acidic conditions at the same temperature, until a viscosity in the range of 35 to 80 mPa.s is reached, (e) the pH is then adjusted to a value in the range of 5.8 to 6.5, and the final mole ratio of urea to formaldehyde is adjusted to a value between 1.0:1.0 and 1.0:1.30 by adding urea, whereafter the temperature is allowed to drop, and (f) when the temperature has dropped to below 50° C., the final pH is adjusted to a value in the range of 7.0 to 8.0.

2. A process according to claim 1, characterized in that the pH is adjusted to 5.0 in step (c).

3. A process according to claim 1, characterized in that the final mole ratio of urea to formaldehyde is adjusted to a value of 1.0:1.0 to 1.0:1.30 in step (e).

4. A process according to any one of claim 1, characterized in that the final pH is adjusted to 7.2±0.1 in step (f).

* * * * *